US012574113B2

(12) United States Patent
Kong et al.

(10) Patent No.: US 12,574,113 B2
(45) Date of Patent: Mar. 10, 2026

(54) ENVIRONMENTAL DISTURBANCE DETECTION AND LOCALIZATION USING COHERENT MODEM

(71) Applicant: CIENA CORPORATION, Hanover, MD (US)

(72) Inventors: Fanqi Kong, Nepean (CA); Michael Reimer, Stittsville (CA); Maurice O'Sullivan, Ottawa (CA); Michael Y. Frankel, Hallandale Beach, FL (US)

(73) Assignee: CIENA CORPORATION, Hanover, MD (US)

( * ) Notice: Subject to any disclaimer, the term of this patent is extended or adjusted under 35 U.S.C. 154(b) by 264 days.

(21) Appl. No.: 18/454,920

(22) Filed: Aug. 24, 2023

(65) Prior Publication Data

US 2025/0070869 A1     Feb. 27, 2025

(51) Int. Cl.
H04B 10/06 (2006.01)
H04B 10/079 (2013.01)

(52) U.S. Cl.
CPC ... H04B 10/0791 (2013.01); H04B 10/07951 (2013.01)

(58) Field of Classification Search
CPC .......... H04B 10/0791; H04B 10/07951; H04B 10/0795; H04B 10/07957; H04B 10/6162; H04B 10/6164; H04B 10/6165; H04B 10/40; H04B 10/6163; H04B 10/0771; H04B 10/2581; H04J 14/04; H04L 7/0075

USPC ....... 398/202, 203, 204, 205, 206, 207, 208, 398/209, 135, 136, 137, 138, 139, 158, 398/159, 44, 143, 154, 155, 33, 38, 10, 398/13, 17, 20, 25, 26, 27, 183, 188, 214
See application file for complete search history.

(56) References Cited

U.S. PATENT DOCUMENTS

| | | | |
|---|---|---|---|
| 4,586,186 A | 4/1986 | Anderson | |
| 2017/0346550 A1 | 11/2017 | Von Der Weid et al. | |
| 2022/0286201 A1* | 9/2022 | Mazur | H04J 14/06 |
| 2024/0072891 A1* | 2/2024 | Bjørnstad | H04B 10/0791 |
| 2024/0195499 A1* | 6/2024 | Bjørnstad | H04L 41/064 |

OTHER PUBLICATIONS

"PCT/US2024/043623 International Search Report and the Written Opinion", Mailed Nov. 19, 2024, Nov. 19, 2024, 10 pgs.
Ip, et al., "Vibration Detection and Localization Using Modified Digital Coherent Telecom Transponders", Ip et al. JLT 2022, https://ieeexplore.ieee.org/document/9665265, Mar. 8, 2023, 11 pgs.

(Continued)

*Primary Examiner* — Hanh Phan
(74) *Attorney, Agent, or Firm* — GUNTIN & GUST, PLC; Kenneth S. Kwan

(57) ABSTRACT

Aspects of the subject disclosure may include, for example, obtaining an estimate of a phase of a reference associated with a signal received over an optical channel, obtaining an estimate of a frequency of a carrier associated with the signal, and based on the estimate of the phase of the reference and the estimate of the frequency of the carrier, estimating a location dependent property associated with a disturbance to the optical channel to determine a location estimate for the disturbance. Other embodiments are disclosed.

22 Claims, 7 Drawing Sheets

(56) References Cited

OTHER PUBLICATIONS

Marra, et al., "Optical interferometry-based array of seafloor environmental sensors using a transoceanic submarine cable", Science 376, 874-879 (2022), https://www.science.org/doi/10.1126/science.abo1939, May 20, 2022, 7 pgs.

Zhan, et al., "Optical polarization-based seismic and water wave sensing on transoceanic cables", Science, 371, 931-936 (2021), https://www.science.org/doi/10.1126/science.abe6648, Feb. 26, 2021, 6 pgs.

* cited by examiner

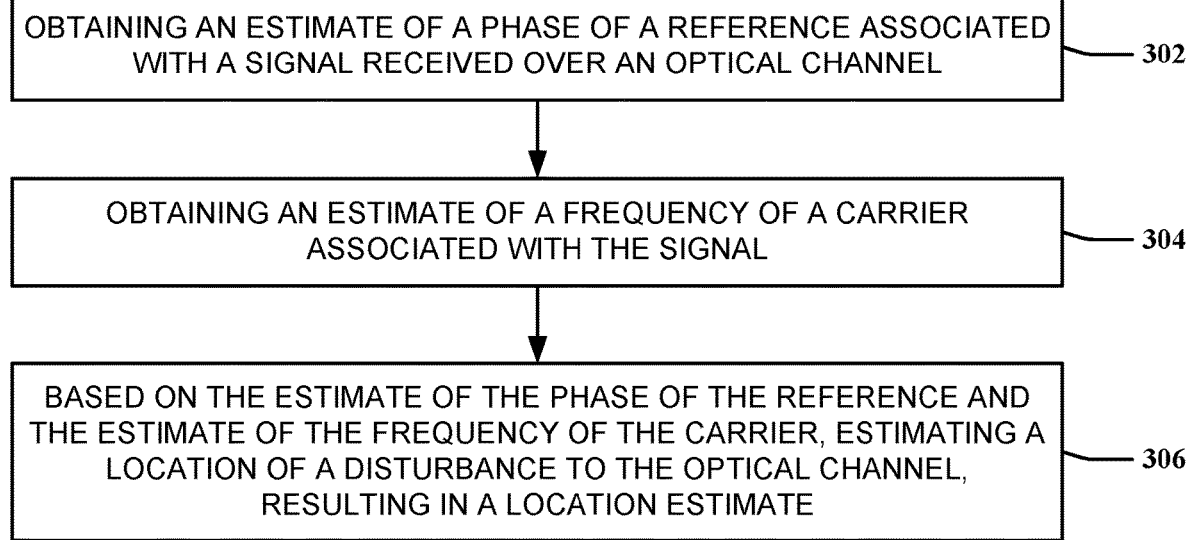

OBTAINING AN ESTIMATE OF A PHASE OF A REFERENCE ASSOCIATED WITH A SIGNAL RECEIVED OVER AN OPTICAL CHANNEL — 302

OBTAINING AN ESTIMATE OF A FREQUENCY OF A CARRIER ASSOCIATED WITH THE SIGNAL — 304

BASED ON THE ESTIMATE OF THE PHASE OF THE REFERENCE AND THE ESTIMATE OF THE FREQUENCY OF THE CARRIER, ESTIMATING A LOCATION OF A DISTURBANCE TO THE OPTICAL CHANNEL, RESULTING IN A LOCATION ESTIMATE — 306

ENVIRONMENTAL DISTURBANCE DETECTION AND LOCALIZATION USING COHERENT MODEM

FIELD OF THE DISCLOSURE

The subject disclosure relates to environmental disturbance detection and localization using a coherent modem.

BACKGROUND

Research over the past few years on techniques that exploit the sensitivity of optical fiber to environmental perturbations (e.g., traffic, seismic waves, and lightning activities) has shown that existing networks of optical cables can potentially be used as sensor arrays. For instance, a submarine telecommunication network can serve as a global, real-time seismic network for monitoring earthquakes and earth crust dynamics.

BRIEF DESCRIPTION OF THE DRAWINGS

Reference will now be made to the accompanying drawings, which are not necessarily drawn to scale, and wherein:

FIG. 3 depicts an illustrative embodiment of a method in accordance with various aspects described herein.

DETAILED DESCRIPTION

Environmental disturbances can induce vibration, pressure, or temperature changes to an optical fiber, which can alter the optical path length of the fiber link. This distortion results in an optical phase variation, or equivalently by its temporal derivative, a frequency variation of signals detected at a receiver. Of these, the frequency variation results in a group delay variation in the presence of chromatic dispersion. In coherent optical communications, the optical phase is known as carrier phase. The carrier phase and the group delay variation are readily tracked by coherent modems, for example, the former by carrier recovery and the latter by clock recovery. Detecting changes in optical phase is an extremely sensitive measurement since it can easily transduce a physical distortion on the order of a wavelength (e.g., a few hundred nanometers).

Figure 1:
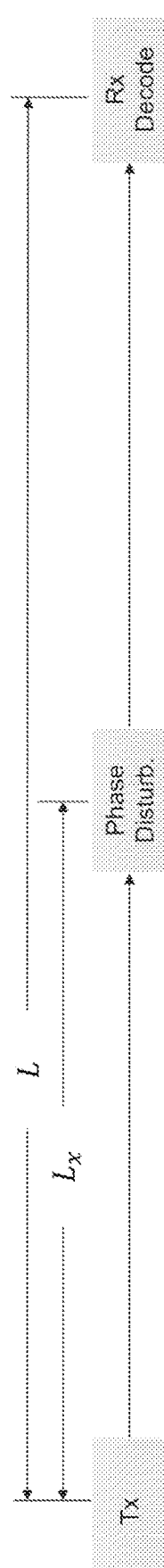
FIG. 1 illustrates an example detection of an environmental (e.g., phase) disturbance, in an optical link of length L, at a distance $L_x$ from a transmitter Tx.

FIG. 1 illustrates an example detection of an environmental (e.g., phase) disturbance, in an optical link of length L, at a distance $L_x$ from a transmitter Tx. At the receiving end, a receiver Rx detects an anomalous carrier phase variation.

By monitoring the carrier phase over time, disturbances that occur along the cable can be identified. However, since received signals accumulate phase variation along the optical fiber link, it is generally not trivial to localize where the disturbances actually occur.

Conventional, distributed sensing methods with localization capabilities (e.g., Distributed Acoustic Sensing (DAS) and Optical Time Domain Reflectometer (OTDR)) rely on back scattered light and have limited sensing range (i.e., around 100-150 kilometers (km)) due to low signal-to-noise ratio (SNR). In addition, DAS is not compatible with isolators in fiber amplifiers, which limits its sensing range to within a single fiber span. State of Polarization (SOP) monitoring of submarine cables, which involves accumulating signals along the fiber, lack localization capabilities. It also has low SNR as compared to phase monitoring methods. Laser interferometry, where a submarine cable is monitored for laser carrier phase based on loopback links, requires a specially installed reflecting fiber Bragg grating (FBG) at each fiber span. Bidirectional correlation of laser carrier phase requires correlation of bidirectional transmission and synchronization of signals. This technique has limited real-time monitoring capabilities. It is believed that there is currently no available solution that can localize disturbances in real-time based (e.g., only) on forward transmitted signals.

The subject disclosure describes illustrative embodiments of an environmental disturbance sensing and localization system that is capable of (e.g., simultaneously) detecting and localizing environmental disturbances to an optical fiber link. In exemplary embodiments, the sensing and localization system may use or combine digital signal processing (DSP) signal(s) from (or obtained in) a coherent modem—i.e., clock phase and carrier phase—to facilitate disturbance sensing and localization. In one or more embodiments, the sensing and localization system may leverage a clock recovery algorithm in a coherent modem as well as the effects of chromatic dispersion in fiber links to detect and approximate the location of disturbances.

Optical fiber is a dispersive material in which different colors of light travel at different speeds. Chromatic dispersion (CD) is the physical quantity that describes this property. The total CD is proportional to the distance that light travels in a uniform optical fiber. When a light wave or signal first undergoes phase modulation (PM) (e.g., where the optical signal is imprinted with a time-varying phase due to a disturbance, such as an earthquake), the amplitude (envelope) of the signal is initially unchanged. However, subsequent propagation of the light wave through the dispersive optical fiber causes the pulse to shift in time (time jitter). Since the phase disturbance generally occurs somewhere along the link, only CD that occurs after the disturbance participates in shifting the pulse. Thus, by measuring the temporal shift of the signal envelope (such as the clock phase), the amount of residual CD from the site of phase disturbance to the receiver can be decoded and the (e.g., approximate) location at which the disturbance occurred can be identified. In other words, CD can be leveraged as a "location dependent property" that a receiver can measure to then identify (e.g., based on a mapping of known CD values to spans of fiber along an optical link) the approximate location of the phase disturbance.

In exemplary embodiments, the sensing and localization system leverages the time delay of the optical envelope to quantify the amount of chromatic dispersion that interacts with the phase modulation of the disturbance. This time delay is a group delay. It is also known as clock recovery phase and, in coherent communications, is generally tracked by a coherent modem's clock recovery module. In one or more embodiments, to generalize the detection to more advanced monitoring, the sensing and localization system may be configured to decode the pulse shape of the envelope, which may provide additional information regarding the disturbance.

The sensing algorithm described herein advantageously provides forward localization capability in which unidirectional, forward transmitted signals are used to detect/localize disturbances. This ensures high SNR, provides for real-time localization capability, and allows for a large sensing range in submarine cables (e.g., 10,000 km or longer). Unidirectional detection reduces or eliminates the need for cross correlation signal processing of bidirectional signals and enables real-time monitoring, which is in stark contrast to existing detection techniques. Leveraging/reuse of clock phase and carrier phase information also reduces or minimizes DSP complexity since little to no additional DSP development and/or line system modifications are needed. Furthermore, data regarding detected disturbances can also assist with overall fault detection in the optical network.

Figure 2A:
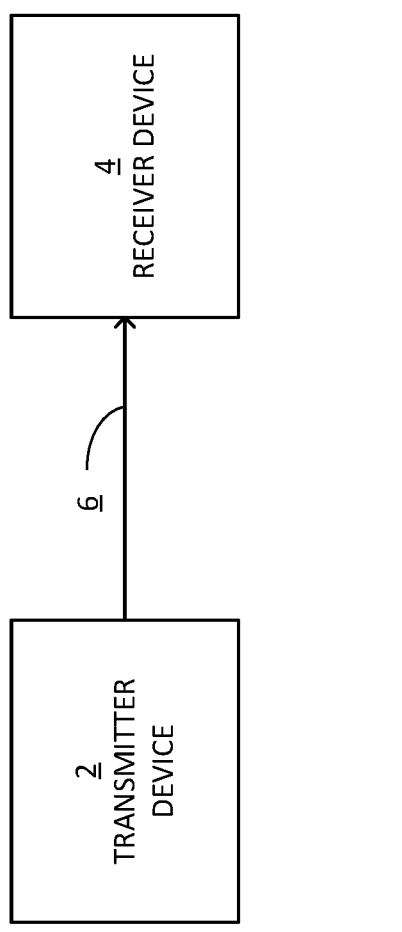
FIG. 2A is a diagram of a non-limiting example of a communication network in accordance with various aspects described herein.

FIG. 2A is a diagram of a non-limiting example of a communication network 1 in accordance with various aspects described herein. The communication network 1 may include at least one transmitter device 2 and at least one receiver device 4. The transmitter device 2 may be capable of transmitting signals over a communication channel, such as a communication channel 6. The receiver device 4 may be capable of receiving signals over a communication channel, such as the communication channel 6. In various embodiments, the transmitter device 2 may also be capable of receiving signals and/or the receiver device 4 may also be capable of transmitting signals. Thus, one or both of the transmitter device 2 and the receiver device 4 may be capable of acting as a transceiver. In one or more embodiments, the transmitter device 2 and/or the receiver device 4 may be a modem.

The communication network 1 may include additional elements not shown in FIG. 2A. For example, the communication network 1 may include one or more additional transmitter devices, one or more additional receiver devices, and one or more other devices or elements involved in the communication of signals in the communication network 1.

In some embodiments, the signals that are transmitted and received in the communication network 1 may include optical signals and/or electrical signals. For example, the transmitter device 2 may be a first optical transceiver, the receiver device 4 may be a second optical transceiver, and the communication channel 6 may be an optical communication channel. In certain embodiments, one or both of the first optical transceiver and the second optical transceiver may be a coherent modem.

In various embodiments, each optical communication channel in the communication network 1 may include one or more links, where each link may include one or more spans, and where each span may include a length of optical fiber and one or more optical amplifiers. Where the communication network 1 involves the transmission of optical signals, the communication network 1 may include additional optical elements not shown in FIG. 2A, such as wavelength selective switches, optical multiplexers, optical de-multiplexers, optical filters, and/or the like.

Figure 2B:
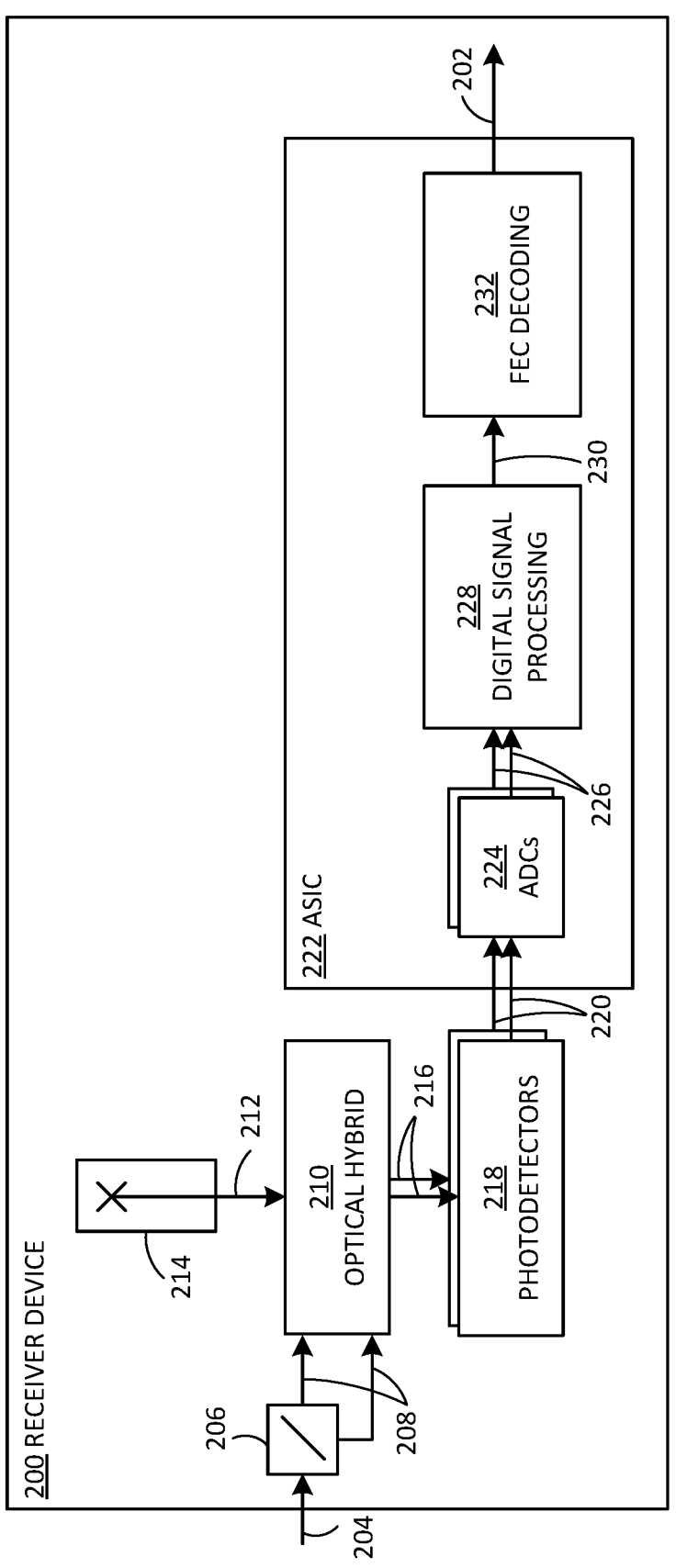
FIG. 2B illustrates an example receiver device in accordance with various aspects described herein.

FIG. 2B illustrates an example receiver device 200 in accordance with various aspects described herein. In various embodiments, the receiver device 200 may be the same as or similar to (or otherwise correspond to) the receiver 4 of FIG.

2A, and may be configured to receive an optical signal 204, which may comprise a degraded version of an optical signal generated by a transmitter device (e.g., the transmitter device 2 of FIG. 2A). The optical signal generated by the transmitter device may be representative of information bits (also referred to as client bits) which are to be communicated to the receiver device 200. The optical signal generated by the transmitter device may be representative of a stream of symbols. According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques, such as frequency division multiplexing (FDM), polarization-division multiplexing (PDM), single polarization modulation, modulation of an unpolarized carrier, mode-division multiplexing, spatial-division multiplexing, Stokes-space modulation, polarization balanced modulation, wavelength division multiplexing (WDM) (where a plurality of data streams is transmitted in parallel, over a respective plurality of carriers, where each carrier is generated by a different laser), and/or the like.

The receiver device 200 may be configured to recover corrected client bits 202 from the received optical signal 204. The receiver device 200 may include a polarizing beam splitter 206 configured to split the received optical signal 204 into polarized components 208. According to one example implementation, the polarized components 208 may include orthogonally polarized components corresponding to an X polarization and a Y polarization. An optical hybrid 210 may be configured to process the components 208 with respect to an optical signal 212 produced by a laser 214, thereby resulting in optical signals 216. Photodetectors 218 may be configured to convert the optical signals 216 output by the optical hybrid 210 to analog electrical signals 220. The frequency difference between the Rx laser and the Tx laser is the Intermediate Frequency, and an offset of that away from nominal can be called fIF. (The nominal difference is usually zero.) According to one example implementation, the analog signals 220 may include four signals corresponding, respectively, to the dimensions XI, XQ, YI, and YQ, where XI and XQ denote the in-phase and quadrature components of the X polarization, and YI and YQ denote the in phase and quadrature components of the Y polarization. Together, elements such as the beam splitter 206, the laser 214, the optical hybrid 210, and the photodetectors 218 may form a communication interface configured to receive optical signals from other devices in a communication network.

As shown in FIG. 2B, the receiver device 200 may include an application specific integrated circuit (ASIC) 222. The ASIC 222 may include analog-to-digital converters (ADCs) 224 that are configured to sample the analog signals 220 and generate respective digital signals 226. In certain alternate embodiments, the ADCs 224 or portions thereof may be separate from the ASIC 222. The ADCs 224 may sample the analog signals 220 periodically at a sample rate that is based on a signal received from a voltage-controlled oscillator (VCO) at the receiver device 200 (not shown). The ASIC 222 may be configured to apply digital signal processing to the digital signals 226 using a digital signal processing system 228. The digital signal processing system 228 may be configured to perform equalization processing that is designed to compensate for a variety of channel impairments, such as CD, SOP rotation, mean polarization mode dispersion (PMD) that determines the probability distribution which instantiates as differential group delay (DGD), polarization dependent loss or gain (PDL or PDG), and/or other effects.

The digital signal processing system 228 may further be configured to perform carrier and frequency recovery processing. In various embodiments, carrier recovery processing may involve determining detected phases of a plurality of symbols based on the transmitted signal. The transmitted signal comprises a plurality of data symbols and predefined pilot symbols. Such processing may be implemented based on the detection of received phases of the pilot symbol set, and reference phases of the pilot symbol set. One or more controllers may be involved in the control. Carrier frequency can be obtained by taking the temporal derivative of the carrier phase. In certain embodiments, carrier recovery may additionally, or alternatively, involve calculating an estimate of carrier frequency offset (i.e., the difference between the carrier frequency of the transmitter laser and the carrier frequency of the receiver laser 214).

According to some example implementations, the digital signal processing system 228 may further be configured to perform operations such as multiple-input-multiple-output (MIMO) filtering, clock recovery, and FDM subcarrier de-multiplexing. Clock recovery may involve estimating the phase difference between the detection instant and the received symbols. In various embodiments, clock recovery may be performed using a phase detector. In coherent optical communication systems, the clock phase can be detected by correlation in the time or frequency domain. It may be self referencing or use a known reference. One or more controllers may be involved in the control. The group delay can be caused by interaction of carrier frequency shift and chromatic dispersion. The clock phase tracks the group delay and can be used to quantify the amount of chromatic dispersion that interacts with the carrier frequency shift. In various embodiments, carrier recovery and clock recovery may be performed substantially simultaneously. In these embodiments, obtaining an estimate of a frequency of the carrier (carrier recovery) and obtaining an estimate of a phase of a reference (clock recovery) may be performed substantially simultaneously. For instance, there may be a maximum tolerable delay between the obtaining of the carrier frequency and the obtaining of the phase of the reference (e.g., the two estimations may be made within a 5 ns delay from one another), depending on the frequency content associated with the disturbance and the required localization accuracy.

In certain embodiments, the digital signal processing system 228 may also be configured to perform symbol-to-bit demapping (or decoding) using a decision circuit, such that signals 230 output by the digital signal processing system 228 are representative of bit estimates. Where the received optical signal 204 is representative of symbols comprising FEC-encoded bits generated as a result of applying FEC encoding to client bits, the signals 230 may further undergo FEC decoding 232 to recover the corrected client bits 202.

According to some example implementations, the equalization processing implemented as part of the digital signal processing system 228 may include one or more equalizers, some or all of which may be configured to compensate for impairments in the channel response. In general, an equalizer applies a substantially linear filter to an input signal to generate an output signal that is less degraded than the input signal. The filter may be characterized by compensation coefficients which may be incrementally updated from time to time (e.g., every so many clock cycles or every so many seconds) with the goal of reducing the degradation observed in the output signal.

According to exemplary implementations, and as described in more detail below with respect to FIG. 2C, the digital signal processing system 228 may be configured to perform phase disturbance detection and localization based on clock recovery, carrier recovery, and mapping of chromatic dispersion.

Figure 2C:
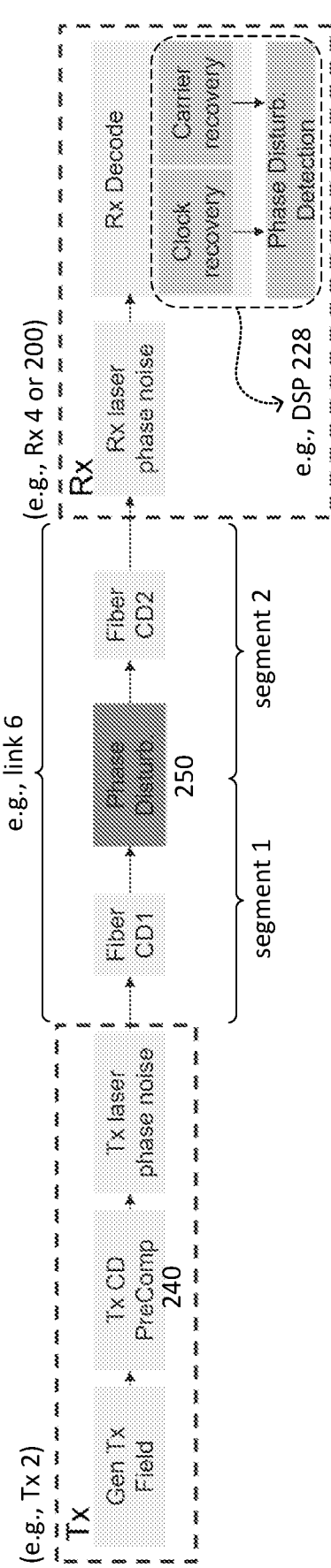
FIG. 2C is a block diagram of an example, non-limiting communication system in which a receiver is capable of detecting and localizing phase disturbances, in accordance with various aspects described herein.

FIG. 2C is a block diagram of an example, non-limiting communication system in which a receiver is capable of detecting and localizing phase disturbances, in accordance with various aspects described herein. In modern coherent optical communication systems, the transceiver is capable of compensating for the impact of chromatic dispersion at the receiver via Tx digital pre-compensation—e.g., here, Tx CD PreComp module 240 in FIG. 2C. A disturbance 250 that is introduced somewhere along the optical link (e.g., link 6) between fiber segments 1 and 2 may modify the propagation constant $\beta = n \cdot \omega \cdot L/c$, resulting in phase and frequency variations. In this scenario, the transfer function of the fiber link, including Tx CD PreComp 240 and the disturbance 250, can be defined as:

$$H = e^{-i\frac{\beta_2}{2}L\omega^2} \cdot e^{i\frac{\beta_2}{2}(L_x)\omega^2} \cdot e^{i\frac{\beta_2}{2}(L-L_x)(\omega+\Delta\omega)^2}, \tag{Eq. 1}$$

where $\beta_2$ is the group velocity dispersion (GVD) of the optical fiber; L is the total length of the fiber link; $L_x$ is the distance between the transmitter and the phase disturbance 250; $\omega$ is the original optical frequency before the phase disturbance 250; and $\Delta\omega$ is the frequency offset caused by the phase disturbance 250. The first term, $$e^{-i\frac{\beta_2}{2}L\omega^2}$$

represents the digital Tx CD pre-compensation. In this equation, the second term, $$e^{i\frac{\beta_2}{2}(L_x)\omega^2},$$

represents the chromatic dispersion prior to the phase disturbance 250—i.e., CD1 in FIG. 2C; and the third term, $$e^{i\frac{\beta_2}{2}(L-L_x)(\omega+\Delta\omega)^2},$$

represents the chromatic dispersion after the phase disturbance 250—i.e., CD2 in FIG. 2C. The transfer function in Eq. 1 also can be rewritten as follows:

$$H = e^{i(-\Delta\omega L_x\beta_2)\omega} \cdot e^{i\frac{\beta_2}{2}L_x\Delta\omega^2}. \tag{Eq. 2}$$

In Eq. 2, the first term represents a time delay of the optical envelope $\tau = \Delta\omega L_x\beta_2$; and the second term represents the phase variation $$\phi = \frac{\beta_2}{2}L_x\Delta\omega^2$$

of the received signal. Since $\Delta\omega \ll \omega$, the second term is negligible. Eq. 2 illustrates that the interplay between the phase disturbance 250 and chromatic dispersion induces a time delay $\Delta\tau_{clc}$ to the received signal envelope, which can be detected by a clock recovery module or function in a coherent modem. The time delay (or clock recovery deviation/phase) can be represented as follows:

$$\Delta\tau_{clc} = -\Delta\omega L_x \beta_2 = -\frac{\partial\varphi}{\partial t} L_x \beta_2, \qquad \text{(Eq. 3)}$$

where $\varphi$ is the carrier phase detected by the carrier recovery module. From Eq. 3, the location of the disturbance can be estimated by:

$$L_x = -\frac{\Delta\tau_{clc}}{\Delta\omega\beta_2} = -\frac{\Delta\tau_{clc}}{\frac{\partial\varphi}{\partial t}\beta_2}, \qquad \text{(Eq. 4)}$$

where $\Delta\tau_{clc}$ and $$\frac{\partial\varphi}{\partial t}$$

are clock delay (or clock recovery deviation/phase) and carrier frequency, respectively, which can be obtained from clock recovery and carrier recovery modules, respectively. As an example, clock recovery circuitry or functionality (e.g., implemented in the digital processing system 228 of FIG. 2B) may provide a clock recovery signal that indicates the detected time delay (or clock recovery deviation/phase), whereas carrier recovery circuitry or functionality (e.g., implemented in the digital processing system 228 of FIG. 2B) may provide a carrier phase signal that indicates the detected carrier phase. $\beta_2$ is the intrinsic property of the optical fiber, which can be obtained from fiber manufacturer data or via measurement. The measurement of the clock recovery signal and the carrier phase signal can be performed substantially simultaneously (e.g., within a threshold time from one another, such as within 5 ns from one another). In various embodiments, location estimation $L_x$ shown in Eq. 4 can be estimated as fast as every 5 ns, and then averaged over the duration of the disturbance event. In a case where the disturbance event lasts 10 ms, for instance, ~2 million instantaneous location estimates can be averaged to improve location precision.

In this way, an estimated phase of a reference associated with a received signal, an estimated carrier frequency, and an estimate of chromatic dispersion in the optical link can be combined to detect/localize a disturbance to the optical link.

Figure 2D:
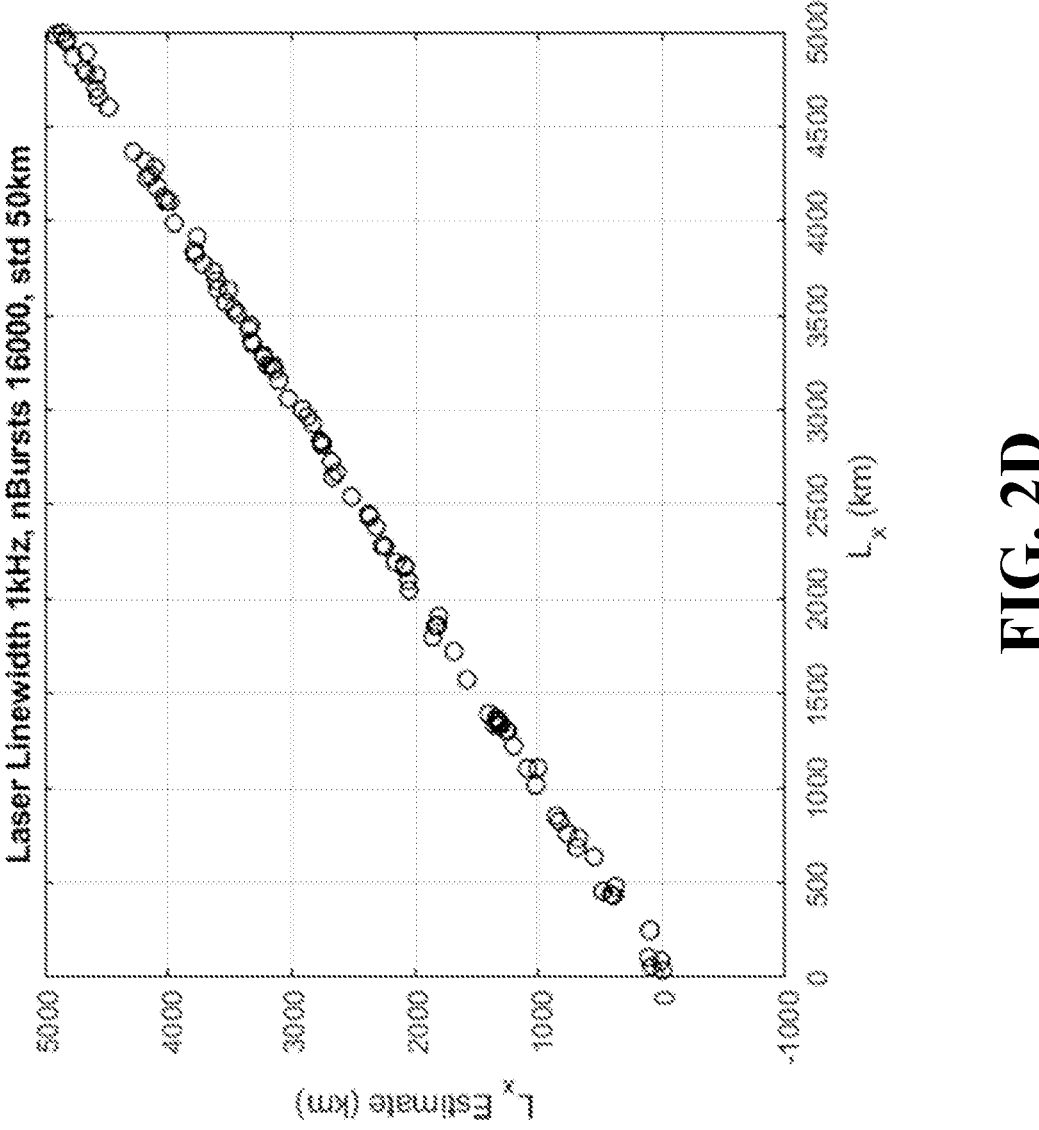
FIG. 2D illustrates localization results of a simulation of an example environmental disturbance sensing and localization system in accordance with various aspects described herein.

FIG. 2D illustrates localization results of a simulation of an example environmental disturbance sensing and localization system in accordance with various aspects described herein. As shown in FIG. 2D, one hundred Monte Carlo tests of randomly-located phase disturbances were simulated (e.g., on a 5000 km non-dispersion-shifted fiber (NDSF) link). The horizontal axis shows the actual locations of the disturbances, while the vertical axis shows the estimates. The standard deviation of the estimated error is ~50 km after averaging ~20,000 instantaneous measurements, which correspond to ~100 μs of averaging time. A sinusoidal phase perturbation at 3 kHz, with 100 rad in amplitude was used in the simulation, which is representative of tampering activities reported in literature.

To further improve spatial resolution of the location estimation, longer averaging up to a typical event duration can be implemented. As an example, for an event duration that is longer than 10 ms, the resolution can be further improved by one order-of-magnitude (by ~5 km).

Because target disturbances introduce phase variations, laser phase noise can be suppressed to avoid signal contamination. In the aforementioned example simulation, a low linewidth laser was used with a 1 kHz linewidth. Digital phase lock DSP processing can be implemented to suppress the laser phase noise.

Further, because target disturbances have specific spectral content (e.g., an earthquake has very low frequency characteristics), in some embodiments, filtering in the frequency domain and/or additional DSP (e.g., filtering out high frequencies in the case of an earthquake) can also be performed to improve SNR and spatial resolution. Furthermore, known vibration/laser noise can be similarly filtered out to improve SNR and spatial resolution. In certain embodiments, spectral filtering can be applied to the clock recovery signal (or derivations therefrom), the carrier phase recovery signal (or derivations therefrom), or both.

It is to be understood and appreciated that, in the various equations derived above, the term $\beta_2$ was assumed to be uniform throughout the entire optical link. However, because an optical link is typically composed of spans of fibers, each fiber span may be characterized by a different $\beta_2$. In one or more embodiments, a dispersion map may be derived to characterize the dispersion in different portions of the overall optical link. In practice, some or all of the above-described equations may be modified to account for these different $\beta_2$ values. A component of localization accuracy is the degree to which the dispersion map and the relation between fiber length and geographic position are known. In one or more embodiments, these uncertainties can be managed by link dispersion map calibration. Of course, a 1-to-1 mapping between dispersion and location generally requires that the fiber dispersion map have no net dispersion degeneracies (which can often occur in dispersion managed links). Conversely, by inducing disturbances to known location(s) of an optical cable and measuring group delay(s), one can (e.g., at a receiver) extract or measure chromatic dispersion so as to identify the $\beta_2$ term(s) of one or more fiber spans. The $\beta_2$ parameter can also be used to distinguish different fiber types. For instance, in terrestrial links, a carrier may determine the type of fiber actually deployed (e.g., Non-Dispersion-Shifted Fiber (NDSF) vs. Non-Zero Dispersion-Shifted Fiber (NZDSF)) by inducing disturbance(s) at known location(s) of the optical cable, identifying $\beta_2$ value(s), and determining whether they match expectations based on inventory fiber type and length.

Figure 2E:
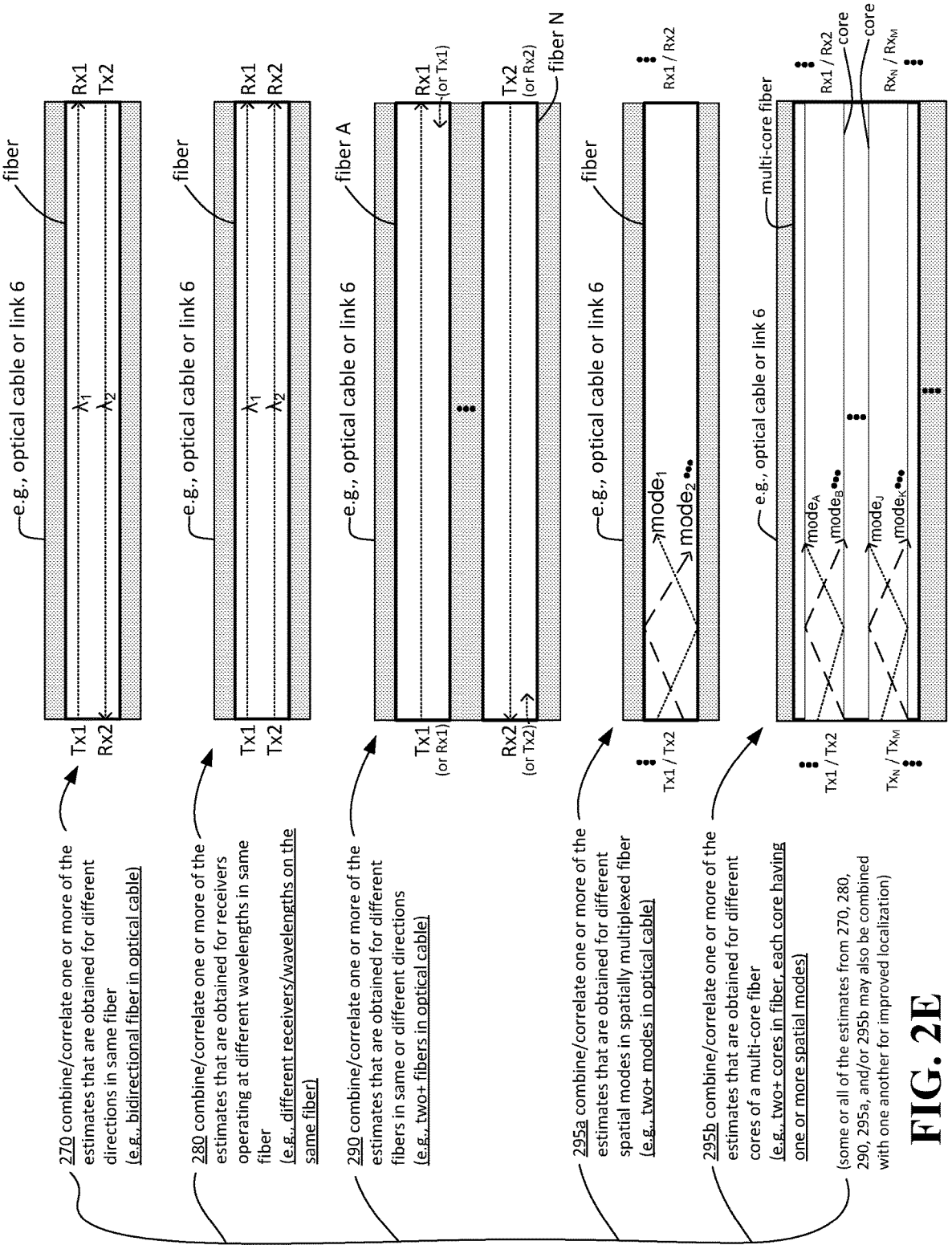
FIG. 2E illustrates example scenarios for combining or correlating estimates for improved disturbance localization, in accordance with various aspects described herein.

In various embodiments, one or more of the clock recovery-based estimate, the carrier recovery-based estimate, and the estimated disturbance location may be combined or correlated with corresponding estimates obtained for the same optical channel (or fiber) in an optical cable and/or with corresponding estimates obtained for different optical channels (or fibers) in an optical cable. FIG. 2E illustrates example scenarios for combining or correlating estimates for improved disturbance localization, in accordance with various aspects described herein.

Since total link CD is measurable and likely to be about the same in each direction of a bidirectional fiber, two-ended measurements (e.g., in real-time or based on post-processing of counter-propagating signals, which may or may not require time stamping) can be made to further improve localization accuracy. See, e.g., reference number 270 of FIG. 2E.

In a case where multiple modems operate at different wavelengths on the same fiber, combining or correlating estimates/measurements based on signals received at these different modems can improve overall disturbance localization accuracy. See, e.g., reference number 280 of FIG. 2E.

A cable disturbance can affect its fibers simultaneously. The location estimates based on signals received over different fibers within the same disturbed cable can be combined to reduce errors in the location estimate. These estimates/measurements can be based on signals received at different coherent receiver modems operating on the different fibers in either direction. See, e.g., reference number 290 of FIG. 2E.

Furthermore, a disturbance can simultaneously affect multiple spatial modes of a spatially multiplexed fiber. The location estimates based on signals received in different spatial modes within the same disturbed fiber can be combined to improve the precision of the location estimate. See, e.g., reference number 295*a* of FIG. 2E. Similarly, a disturbance can simultaneously affect multiple cores of a multi-core fiber (where each core may, for instance, have one or more spatial modes). The location estimates based on signals received in different cores of the same disturbed fiber can be combined to improve the precision of the location estimate. See, e.g., reference number 295*b* of FIG. 2E. It should be understood and appreciated that, in the multi-mode scenario, a respective pair of Tx/Rx may be used for each spatial mode or, alternatively, the same pair of Tx/Rx may be used for different spatial modes. It should also be understood and appreciated that, in the multi-core scenario, a respective pair of Tx/Rx may be used for each core or, alternatively, the same pair of Tx/Rx may be used for different cores. For instance, a MIMO DSP can be used as a single Tx/Rx to operate over different modes/cores. As another example, mode convertors can be used to decouple multiple spatial modes or cores for separate Tx/Rx—e.g., for a multi-core fiber with cores A, B, etc., a mode converter can be incorporated in the Tx to couple light into core A and a corresponding mode converter can be incorporated in the Rx to couple light from core A into the receiver's detector, and so on.

It will be understood and appreciated that laser phase disturbances with no accompanying clock phase shifts can be interpreted as a disturbance proximate to the receiver and thus likely a false positive disturbance. In certain embodiments, false positives can be identified when a co-located disturbance is not detected on another fiber (or on the same fiber) in the opposing direction.

It is to be understood and appreciated that, in cases where estimates/measurements from different coherent receiver modems are used to detect/localize a disturbance, one of these modems, or perhaps a separate central system (or network controller) communicatively coupled to all of the coherent receiver modems, may obtain and aggregate (or harvest) the estimates/measurements for location estimation.

It is to be understood and appreciated that, although one or more of FIGS. 2A-2E might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various components, devices, systems, modules, etc. have been illustrated in FIGS. 2A, 2B, 2C, and 2E as separate components, devices, systems, modules, etc., it will be appreciated that multiple components, devices, systems, modules, etc. can be implemented as a single component, device, system, module, etc., or a single component, device, system, module, etc. can be implemented as multiple components, devices, systems, modules, etc. Additionally, functions described as being performed by one component, device, system, module, etc. may be performed by multiple components, devices, systems, modules, etc., or functions described as being performed by multiple components, devices, systems, modules, etc. may be performed by a single component, device, system, module, etc.

FIG. 3 depicts an illustrative embodiment of a method 300 in accordance with various aspects described herein. For example, the method may be performed by the receiver 4, the receiver 200, or a network controller.

At 302, the method can include obtaining an estimate of a phase of a reference associated with a signal received over an optical channel. For example, the receiver 4, the receiver 200, or a network controller may, similar to that described above with respect to FIG. 2C, perform one or more operations that include obtaining an estimate of a phase of a reference associated with a signal received over an optical channel.

At 304, the method can include obtaining an estimate of a frequency of a carrier associated with the signal. For example, the receiver 4, the receiver 200, or a network controller may, similar to that described above with respect to FIG. 2C, perform one or more operations that include obtaining an estimate of a frequency of a carrier associated with the signal.

At 306, the method can include, based on the estimate of the phase of the reference and the estimate of the frequency of the carrier, estimating a location of a disturbance to the optical channel, resulting in a location estimate. For example, the receiver 4, the receiver 200, or a network controller may, similar to that described above with respect to FIG. 2C, perform one or more operations that include, based on the estimate of the phase of the reference and the estimate of the frequency of the carrier, estimating a location of a disturbance to the optical channel, resulting in a location estimate.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

One or more aspects of the subject disclosure include a device, comprising a processing system including a processor, and a memory that stores executable instructions that, when executed by the processing system, facilitate performance of operations. The operations may include obtaining an estimate of a phase of a reference associated with a signal received over an optical channel, obtaining an estimate of a frequency of a carrier associated with the signal, and based on the estimate of the phase of the reference and the estimate of the frequency of the carrier, estimating a location of a disturbance to the optical channel, resulting in a location estimate.

One or more aspects of the subject disclosure include a non-transitory machine-readable medium, comprising executable instructions that, when executed by a processing system including a processor, facilitate performance of operations. The operations may include obtaining an estimate of a phase of a reference associated with a signal received over an optical channel, obtaining an estimate of a frequency of a carrier associated with the signal, and based on the estimate of the phase of the reference and the estimate of the frequency of the carrier, estimating a location of a disturbance to the optical channel, resulting in a location estimate.

One or more aspects of the subject disclosure include a method. The method may include obtaining, by a processing system including a processor, an estimate of a phase of a reference associated with a signal received over an optical channel, obtaining, by the processing system, an estimate of a frequency of a carrier associated with the signal, and based on the estimate of the phase of the reference and the estimate of the frequency of the carrier, estimating, by the processing system, a location of a disturbance to the optical channel, resulting in a location estimate.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments. Additionally, functions described as being performed by one component or system may be performed by multiple components or systems, or functions described as being performed by multiple components or systems may be performed by a single component or system, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising obtaining an estimate of a phase of a reference associated with a signal received over an optical channel, obtaining an estimate of a frequency of a carrier associated with the signal, and

estimating a location dependent property associated with a disturbance to the optical channel to determine a location estimate for the disturbance, wherein determining the location estimate involves one or more calculations that include the estimate of the phase of the reference and the estimate of the frequency of the carrier.

2. The device of claim 1, wherein the optical channel comprises a spatially multiplexed fiber associated with a plurality of spatial modes, wherein the signal is received in a first spatial mode of the plurality of spatial modes, and wherein the location estimate is further based on a phase estimation and a carrier frequency estimation for at least one other signal received in at least one other spatial mode of the plurality of spatial modes.

3. The device of claim 1, wherein the estimating the location dependent property is performed during post-processing or in real-time.

4. The device of claim 1, wherein the optical channel comprises a fiber in an optical cable, wherein the signal is received at a first coherent receiver that operates at a first wavelength over the fiber, and wherein the location estimate is further based on a phase estimation and a carrier frequency estimation for a different signal received at a second coherent receiver that operates at a second wavelength over the fiber.

5. The device of claim 1, wherein the optical channel comprises one fiber of a plurality of fibers in an optical cable, and wherein the operations further comprise combining the location estimate with one or more other location estimates associated with the disturbance, resulting in a combined location estimate, wherein the one or more other location estimates are obtained for different respective signals received over different respective fibers of the plurality of fibers.

6. The device of claim 1, wherein the location dependent property is chromatic dispersion.

7. The device of claim 1, wherein the optical channel comprises at least one of a plurality of channels in a coherent optical wavelength division multiplexing (WDM) link.

8. The device of claim 1, wherein the disturbance comprises a physical disturbance at a portion of an optical cable that introduces a time-varying phase to the signal.

9. The device of claim 1, wherein the reference comprises a detected receive clock.

10. The device of claim 1, wherein the reference comprises a set of predetermined repeating symbols.

11. The device of claim 1, wherein the obtaining the estimate of the frequency of the carrier is performed based on carrier phase.

12. The device of claim 1, wherein the device comprises a transceiver, and wherein the estimating the location dependent property is performed based only on the signal received over the optical channel.

13. The device of claim 1, wherein the device comprises a network controller that is communicatively coupled with one or more coherent receiver modems.

14. The device of claim 1, wherein the obtaining the estimate of the phase of the reference and the obtaining the estimate of the frequency of the carrier are performed substantially simultaneously.

15. The device of claim 1, wherein the estimating the location dependent property localizes the disturbance based on a dispersion mapping of the optical channel and based on group delay that results from the disturbance to the optical channel.

16. The device of claim 1, wherein the obtaining the estimate of the phase of the reference is performed based on a clock recovery signal that quantifies group delay that results from the disturbance to the optical channel.

17. The device of claim 1, wherein the operations further comprise:

performing spectral filtering of a clock recovery signal and a carrier phase recovery signal to improve a resolution of the location estimate.

18. The device of claim 1, wherein the optical channel comprises a first core of a plurality of cores of a fiber, wherein the signal is received via the first core, and wherein the location estimate is further based on a phase estimation and a carrier frequency estimation for at least one other signal received via at least one other core of the plurality of cores.

19. The device of claim 1, wherein one or more perturbances to one or more known portions of the optical channel are induced to derive a dispersion mapping of the optical channel, to determine a fiber type of one or more spans of the optical channel, or a combination thereof.

20. The device of claim 1, wherein the estimating the location dependent property to determine the location estimate provides for unidirectional disturbance detection and localization.

21. A non-transitory machine-readable medium, storing executable instructions that, when executed by a processing system including a processor, facilitate performance of operations, the operations comprising:

obtaining an estimate of a phase of a reference associated with a signal received over an optical channel;

obtaining an estimate of a frequency of a carrier associated with the signal; and estimating a location dependent property associated with a disturbance to the optical channel to determine a location estimate for the disturbance, wherein determining the location estimate involves one or more calculations that include the estimate of the phase of the reference and the estimate of the frequency of the carrier.

22. A method, comprising:

obtaining, by a processing system including a processor, an estimate of a phase of a reference associated with a signal received over an optical channel;

obtaining, by the processing system, an estimate of a frequency of a carrier associated with the signal; and estimating, by the processing system, a location dependent property associated with a disturbance to the optical channel to determine a location estimate for the disturbance, wherein determining the location estimate involves one or more calculations that include the estimate of the phase of the reference and the estimate of the frequency of the carrier.

* * * * *